May 11, 1954 — M. R. SEELHOFF — 2,677,962
DYNAMOMETER CONTROL
Original Filed Aug. 23, 1948 — 2 Sheets-Sheet 1
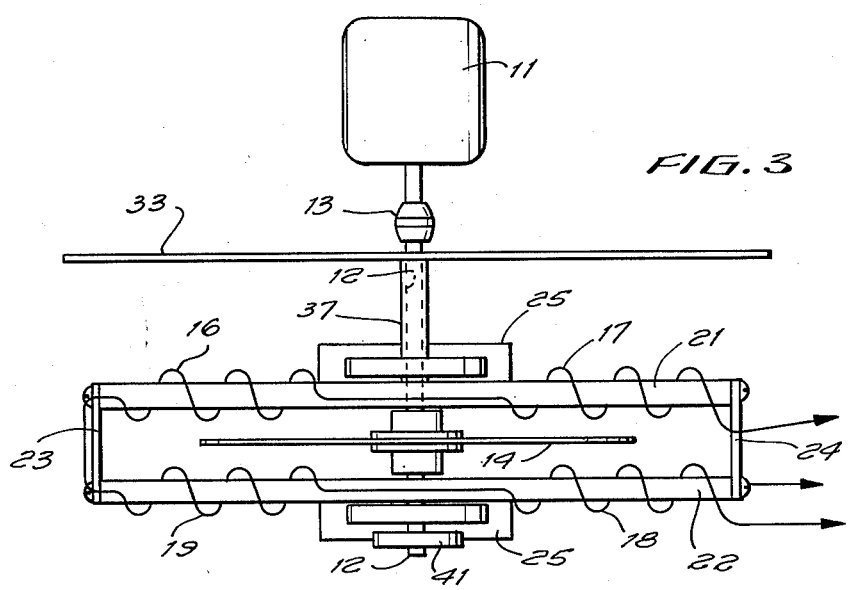
FIG. 3
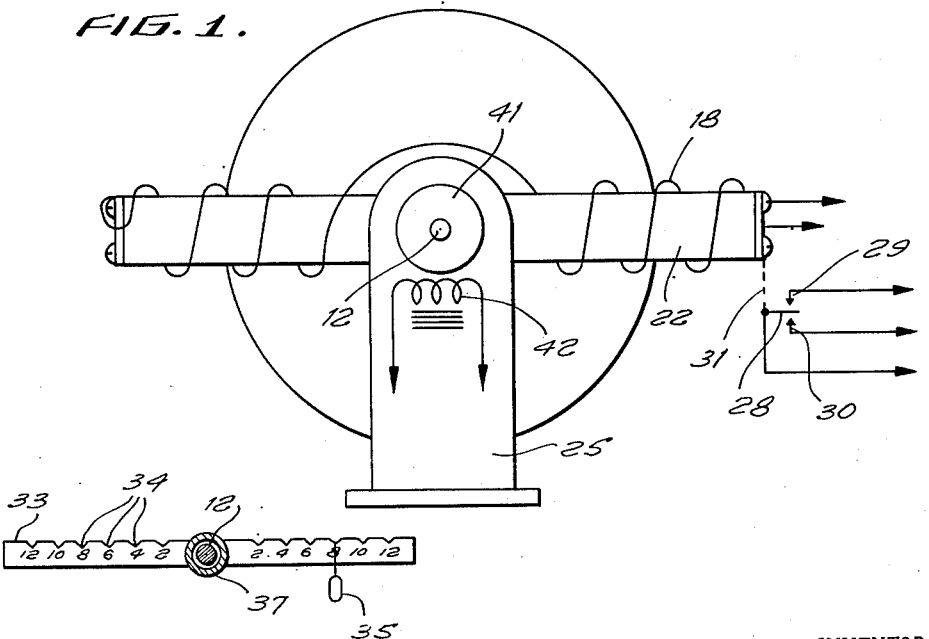
FIG. 1.
FIG. 4.
INVENTOR.
MANLEY RUSSELL SEELHOFF
BY James and Franklin
ATTORNEYS

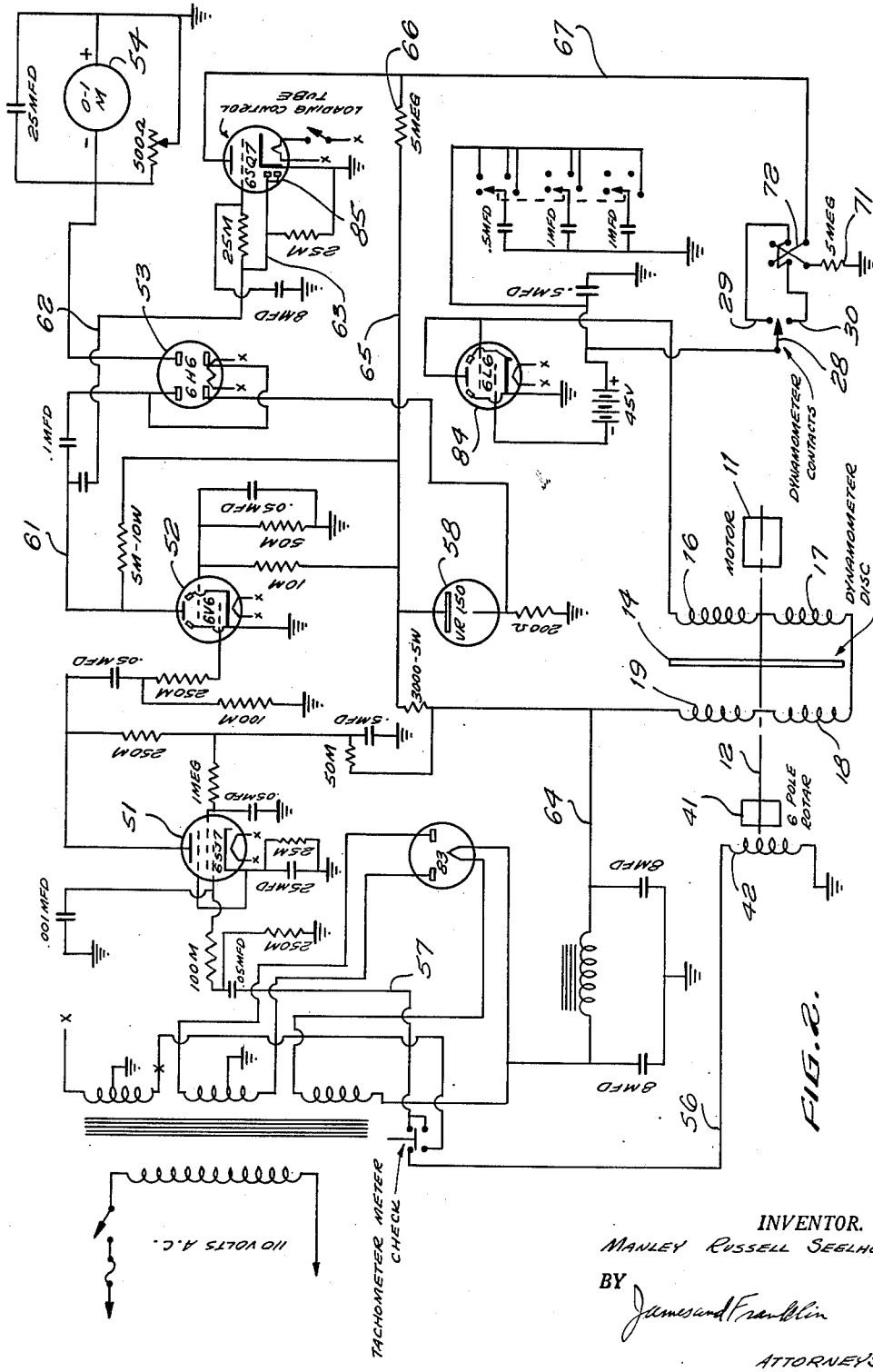

Patented May 11, 1954

2,677,962

UNITED STATES PATENT OFFICE 2,677,962

DYNAMOMETER CONTROL

Manley Russell Seelhoff, Owosso, Mich., assignor to Redmond Company, Inc., Owosso, Mich., a corporation of Michigan Continuation of abandoned application Serial No. 45,677, August 23, 1948. This application March 16, 1953, Serial No. 342,328

16 Claims. (Cl. 73—134)

The present invention relates to a control system for the operation of electromagnetic-drag dynamometers used for measuring torque and speed characteristics of motors and the like.

This application is a continuation of application Ser. No. 45,677, entitled "Testing Devices," filed August 23, 1948, now abandoned.

Dynamometers of this general type have been employed in the past. In general they comprise a disk adapted to be rotated by the motor being tested, a variably energizable electromagnet being mounted in operative relation to the disk, the degree of energization of the electromagnet determining the drag exerted on the disk and hence the torque exerted on the motor.

The disk is usually conductive, and as it is rotated through the magnetic field eddy currents are induced in it which electromagnetically react with the field to produce the drag. When sporadic testing of motors is desired, or when only a small number of motors are to be tested, the devices of the prior art have been satisfactory. However, when mass produced motors, for example, those of the fractional horsepower type, are to be tested, time becomes an important factor. Assembly line production, if it is to be economically effective, requires that each operation must be performed as quickly and accurately as possible. Much time and effort has been expended in improving the manipulative aspects of assembly line operation insofar as the manufacture of small electric motors is concerned. Motors must, however, be tested before they are shipped, and it avails a concern but little if it can produce motors rapidly when the testing of motors is a time consuming and expensive operation.

One basic drawback of the electromagnetic type of dynamometer is the fact that when the electromagnet is energized while the motor is starting, a torque is exerted on the motor and it therefore takes an appreciable time, sometimes measured in minutes, for the motor to come up to speed. Indeed, if the torque exerted should be too great, the motor might never come up to speed. It is, of course, possible to have the testing operator manually connect and disconnect the electromagnet from its energizing source, but it is well known that proper assembly line operation involves the minimization of action on the part of the personnel. Moreover, it would be a matter of judgment on the part of the operator as to the precise moment when the electromagnet is to be energized, and this too is undesirable.

It is the prime object of the present invention to produce an arrangement and interconnection of parts by means of which the time involved in testing motors by means of an electromagnetic-type dynamometer may be drastically reduced, and this in a fully automatic manner. To that end the energizing circuit for the electromagnet is provided with control means sensitive to the speed of rotation of the motor being tested, this control means reducing, and in its preferred form completely removing, the energization of the electromagnet until the motor has reached a predetermined speed of rotation. With the electromagnet deenergized or having a reduced energization, the torque exerted on the motor is minimal and the motor will therefore come up to speed much more rapidly than would otherwise be the case, in a time measured in a small number of seconds. When it has come up to speed the electromagnet is automatically energized to a degree appropriate to apply the desired torque to the motor. When the motor is stopped after it has been tested, the electromagnet is automatically de-energized and the control system is therefore reset, ready for the next motor to be tested. Consequently all that the testing operator need do is connect the motor in testing position, turn it on and then, when he sees that the electromagnet has become energized, make any appropriate readings or tests. When the testing is over the operator need merely disconnect the motor which has been tested and connect the next motor.

It is desirable, and indeed almost necessary, when a motor is being tested in this manner, to have an accurate indication of the speed at which it is operating. Ordinarily separate speed-indicating instrumentalities are employed, such as tachometers, stroboscopes and the like. The arrangement of the present invention utilizes an electrical instrumentality of a high degree of accuracy to give continuous speed readings. In contradistinction to the prior art, this instrumentality performs a function other than merely indicating the speed, to wit, its output is fed to the means which controls the energization of the electromagnet, and in that way the electromagnet energization is rendered speed-sensitive.

It has been proposed in the past to provide means for automatically modifying the energization of the electromagnet, once the motor has come up to speed, in order to vary the torque applied to the motor in accordance with its speed of operation or to accommodate desired changes in applied torque. The prior art arrangements for accomplishing this result have been mechanical in nature, have involved linkages, moving parts and sliding contacts, and consequently have been only of a rough and ready character insofar as accuracy is concerned. The control system of the present invention, however, lends itself very readily to precise control of the energization of the electromagnet after the motor has come up to speed and in accordance with the variations in the speed of operation of the motor or the magnitude of the torque to be applied. This control is accomplished electronically, by varying the bias on the grid of a tube through which the energizing current for the electromagnet passes.

As here specifically disclosed, the motor to be tested, in addition to rotating the magnetizable disk upon which the electromagnet acts, also rotates a generator the output of which varies with its speed of rotation. It is that electrical output which, in a known manner, actuates an indicator to show the speed of the motor. A portion of that output is led to a time-sensitive network which controls the bias on the grid of a first electronic tube, the output of which tube in turn controls the bias on a second tube in the energizing circuit of the electromagnet. The second tube is normally biased to cutoff so that the electromagnet is not energized. When the output of the generator has a character indicating that the motor is rotating at a predetermined speed, the bias on the grid of the first tube will be varied, the output of the first tube will correspondingly vary, and through an appropriate electrical circuit the bias on the grid of the second tube will be correspondingly altered so as to permit said second tube to pass current and thus energize the electromagnet to a desired degree.

By varying the bias on the second tube, the degree of energization of the electromagnet can be controlled. In its preferred form, the change in the grid bias of the second tube is achieved by charging a condenser, the moving parts of the dynamometer controlling electrical connections to that condenser so as to cause it to become charged or to discharge, depending upon the relationship between the torque setting on the dynamometer and the speed of the motor.

To the accomplishment of the above and to such other objects as may hereinafter appear, the present invention relates to an electromagnetic dynamometer testing unit and system as defined in the appended claims and as described in this specification, taken together with the accompanying drawings, in which:

Fig. 1 is an end elevational view of testing apparatus embodying the invention;

Fig. 2 is a wiring diagram of the electrical components;

Fig. 3 is a top plan view of the apparatus of Fig. 1; and

Fig. 4 is a transverse view from a point adjacent the beam scale of the apparatus located near the end to that also shown in Fig. 1.

Referring first to the apparatus itself, the motor to be tested, indicated by the reference numeral 11, is mounted in any appropriate manner so that its output shaft may be connected to the shaft 12 by means of any suitable clutch 13. The shaft 12 is rotatably mounted in spaced uprights 25, and between those uprights a disk 14 of aluminum or the like is secured to the shaft 12 by means of hubs 26 for rotation therewith. Also mounted between the uprights 25 are parallel magnetizable cores 21 and 22 connected at their ends by the non-magnetizable structural elements 23 and 24 and surrounding the magnetizable disk 14. Energizing coils 16, 17, 18 and 19 are wound about the cores 21 and 22 respectively. These parts, which define the electromagnet operatively active on the disk 14, are mounted on the uprights 25 so as to be pivotable about the axis of the shaft 12 and are connected, by means of sleeve 37, to a beam element 33 provided with notches 34, a weight 35 being positionable in any selected one of the notches 34. The electromagnet structure is mechanically connected, as indicated by the broken line 31, to a contact 28 movable between and selectively engageable with fixed contacts 29 and 30 respectively, the latter also serving as positive stops limiting the degree of pivotal movement of the electromagnet structure about the axis of the shaft 12.

The shaft 12 also carries at one end a generator comprising, in this specific instance, a pickup coil 42 operatively associated with a multi-polar generating element 41, specifically one having six poles. Hence the output from the pickup coil 42 will consist of a series of electromagnetically induced impulses the frequency of which will be determined by the speed of rotation of the shaft 12, which is in turn determined by the speed of operation of the motor 11.

The dynamometer per se, as represented by the disk 14, the electromagnet 16—24, the beam 34 and the weight 35, will operate in a well understood manner when the coils 16—19 are energized. The disk 14 will be rotated through an electromagnetic field, eddy currents will be set up therein, electromagnetic interaction will take place, and a drag will therefore be exerted between the pivotally mounted electromagnet structure and the disk 14. Since the electromagnet structure has only a limited degree of movement with respect to the uprights 25, it will tend to be dragged to a position against one positive stop or the other, depending upon the direction of rotation of the motor 11 and hence of the disk 14, and will then exert a torque on the motor via the disk 14. The magnitude of this torque will be dependent upon the degree of energization of the coils 16—19 and the speed of the motor.

The electromagnet structure is ordinarily biased by means of the weight 35 against movement as urged by the rotation of the disk 14. The farther out along the beam 33 the weight 35 is placed, the more force will be required to cause the electromagnet to move with the disk 14. When the electromagnetic interaction between the disk 14 and the pivotally mounted electromagnet structure produces a torque which exactly counterbalances the opposing torque exerted on the electromagnet structure by the weight 35, that structure will assume a balanced horizontal position, at which time the movable contact 28 operatively connected thereto will be midway between the fixed contacts 29, 30 and in engagement with neither. In this condition it will be appreciated that the position of the weight 35 on the beam 33 will be a measure of the exerted torque, and the beam 33 may be correspondingly calibrated.

Having reference now to the control circuits which permit this dynamometer to be automatically controlled insofar as facilitating bringing the motor up to speed is concerned, which circuits are shown in Fig. 2, the output of a full wave rectifier including the tube 83 is fed through a filter circuit and the lead 64 to the lead 65, the latter representing the high potential terminal of the electronic system. A voltage regulator tube 58 is provided to maintain the potential of the lead 65 accurately at a predetermined value. The energizing circuit for the electromagnet may be traced from the high potential lead 65 through the coils 19, 18, 17 and 16 to the plate of tube 84 and then from the cathode of that tube to ground. The control grid of the tube 84 is connected to ground via a .5 mfd. condenser and a battery or other source of potential which applies a strong negative bias, here shown as 45 volts, to the grid, thus biasing the tube 84 to cutoff. Hence normally no current flows through the energizing coils 16—19.

The output of the pickup coil 42 of the generator rotated by the shaft 12 is fed through a conventional electric speed indicating circuit including the tubes 51, 52 and 53 to the milliammeter 54, the latter integrating the pulses fed to it from the pickup coil 42 and giving a visual indication of the speed of rotation of the multipolar element 41 and consequently of the motor 11 being tested. It may be here mentioned that the circuit is such that the magnitude of the pulses after they leave tube 51 is constant and independent of their frequency, only the latter changing with the speed of rotation of the motor.

A portion of the output of the pickup coil 42, after having been amplified by the tubes 51 and 52, is fed to the grid of tube 85 by means of a .01 mfd. coupling condenser and the lead 62. It there passes through a time-sensitive network comprising a pair of 25 megohm resistors connected in parallel to ground, one of the resistors being in series with an 8 mfd. condenser. As here disclosed, the tube 85 is a diode-triode, the diode plates being connected to ground through one of the 25 megohm resistors in order to more precisely control the time characteristic of the circuit by providing positively acting rectification for grid bias control, but in many instances grid rectification alone could be relied on for that purpose. The control grid of tube 85 is normally so biased as to permit the tube to pass current, that current flowing from the high potential lead 65 through the 5 megohm resistor 66 to the triode plate of the tube 85 and thence, via the cathode to ground. This current, when it flows, reduces the positive potential of the triode plate. As the pulses from the pickup coil 42 (of constant magnitude but variable frequency) are fed to the grid of the tube 85, they will tend to bias that grid more and more negatively by charging the 8 mfd. condenser. If these pulses are not frequent enough, the charge on that condenser will not build up, leaking off to ground more rapidly than the recurring pulses can augment it. Hence the output of the tube 85 will not be altered to any appreciable degree. However, as the motor 11 comes up to speed, the impulses will be generated with greater and greater frequency, until finally the charge on the 8 mfd. condenser will build up sufficiently to bias the grid of the tube 85 to cutoff.

Once the grid of the tube 85 has been biased to cutoff current will no longer flow through the resistor 66. Hence the positive potential of the plate of the tube 85 will rise. That plate is connected, by means of lead 67, to a reversing switch 72 which, depending upon the position in which it is set, will connect the lead 67 either to the contact 29 or to the contact 30. The proper position of the switch 72 will correspond to the direction of rotation of the motor 11. If the switch 72 should connect the lead 67 to the contact 29, then the contact 30 will be connected to ground via the resistor 71, and vice versa. The movable contact 28 is connected to the grid circuit of the tube 84 between the biasing battery and the .5 mfd. condenser (aided by a bank of other condensers if desired). The positive potential of the lead 65 is sufficiently great to more than overcome the 45 volt negative bias applied to the grid of the tube 84 and thus is capable, when fully applied to the grid of the tube 84, of causing that tube to pass current and thus energize the electromagnet coils 16—19.

The operation of the system is as follows: The motor 11 is connected to the shaft 12 and is energized. Its shaft will commence to rotate, thus rotating the disk 14 and the multipolar element 41. The electromagnet coils 16—19 will be deenergized and consequently no drag will be exerted on the disk 14. Therefore only a minimal frictional torque will be exerted on the motor 11, and it will come up to speed quite rapidly, in a matter of a few seconds as compared with times sometimes measured in minutes when the electromagnet is always energized, as in the prior art. The instantaneous speed of rotation of the motor 11 will at all times be indicated by the milliammeter 54. During this time the electromagnet structure will be pivoted by the weight 35 in a direction opposite to the rotation of the disk 14, thus causing the contact 28 to engage one of the contacts 29 or 30. It will be assumed that it is contact 29 which is thus engaged, and that the switch 72 is so thrown that the contact 29 is connected to the lead 67. Since, during this time, the tube 85 will be passing current, the positive potential of the plate of that tube will be reduced below its maximum value. The .5 mfd. condenser is charged to the same potential as the plate of the tube 85 by means of the lead 67, switch 72, and contacts 29 and 28, and hence will not sufficiently overcome the bias on the grid of the tube 84. That tube will therefore pass no current.

Once the motor 11 has reached a predetermined speed, which speed is determined by the design of the resistor-condenser circuit connected to the grid of the tube 85, the bias on that grid will be changed sufficiently to cause the tube 85 to cut off. The potential of the plate of the tube 85 will therefore rise to equal the potential of the lead 65 and the .5 mfd. condenser will tend to become similarly charged. At some point in the charging of the condenser the potential impressed thereon will be sufficient to overcome the negative bias applied to the grid of tube 84, that tube will pass current, and the electromagnet coils 16—19 will therefore become energized. As this occurs the electromagnetic interaction between the rotating disk 14 and the pivotal electromagnet structure will tend to pull that structure around with the disk 14, that pull being resisted, however, by the torque exerted on the structure by means of the weight 35 on the beam 33. As the .5 mfd. condenser charges, the current in the electromagnet coil 16—19 will increase, thus increasing the interaction between the disk 14 and the electromagnet, until sufficient drag is developed to pivot the electromagnet structure into a balanced position, its contact 28 separating from the contacts 29. When this occurs the system will be in equilibrium, and the torque exerted on the motor 11 will be that indicated on the beam 33. It is to be noted that once the weight 35 is properly positioned on the beam 33 the operator need do nothing but connect the motor 11 and energize it, this condition of equilibrium being attained fully automatically and quite rapidly.

The operator can vary the torque exerted on the motor 11 by moving the weight 35 along the beam 33, and the system will automatically adjust itself thereto. If the weight 35 is moved farther out along the beam 33, the contacts 28 and 29 will again become engaged, the .5 mfd. condenser will become increasingly positively charged, and the tube 85 will pass more current, thus increasing the energization of the coils 16—19. On the other hand, if the weight 35 is moved inwardly along the beam 33, the contact 28 will engage the contact 30 and the .5 mfd. condenser will discharge through the resistor 71 to ground, thus causing the amount of current passed by the tube 84 to decrease and correspondingly lessening the energization of the coils 16—19. Similarly, if it should be desired to maintain the torque constant, and if the speed of the motor should change, a corresponding automatic movement of the contact 28 between the contacts 29 and 30 will take place, a greater speed of rotation causing engagement of contacts 28 and 30 so as to reduce energization of the electromagnet and thus compensate for the increased speed of rotation of the disk 14 to maintain the torque constant, the opposite effect occurring if the motor speed should decrease somewhat.

For testing all that the operator need do is set values of torque by moving the weight 35 and read the speed on the meter 54. After the testing has been completed, all that the operator need do is remove the motor 11 and replace it with another motor. When the motor 11 is stopped the pickup coil 42 will no longer be supplying rapid impulses to maintain the grid of tube 85 biased to cutoff, the tube 85 will once again pass current, the positive potential of its triode plate will be reduced, the 45 volt negative bias on the grid of tube 84 will once again control, tube 84 will be biased to cutoff, the electromagnet coils 16—19 will again become de-energized, and the entire system will, in less than the time it takes to remove one motor and replace it with another, be ready for the next testing sequence.

In practice the grid circuit of the tube 85 is so designed that the tube will continue to pass current until just before the motor 11 reaches full speed. It will also function to unload the dynamometer immediately after the motor 11 being tested has been de-energized.

Through the use of the control system as here disclosed dynamometer testing of large numbers of motors has been very greatly facilitated, particularly on an assembly line basis. A single testing unit and a single operator can test many times the number of motors that were possible using prior art devices, in a given period of time. The savings in space, labor and equipment costs are material and impressive. The operation of the system is fully automatic, both as to coming up to speed and as to adjusting to variations in speed or desired torque after the motor has attained the desired speed. Continuous indications of torque and speed are provided. In particular, positively acting means are provided for de-energizing the electromagnet of the dynamometer until the motor has reached its pre-determined speed.

While but a single specific embodiment has been here disclosed, it will be apparent that many detailed variations may be made therein all within the spirit of the present invention and as described in the following claims.

I claim:

1. In an automatic testing device for rotating machinery comprising a rotatable element adapted to be connected to and driven by the machine to be tested, an electrically energized drag active on said rotatable element for exerting a torque thereon at least in part dependant on its degree of electrical energization, and an energizing circuit connected to said drag; the improvement which comprises an electrical generator adapted to be operatively connected to and driven by the machine to be tested, the character of the output of said generator being determined by the speed of rotation thereof, means in said energizing circuit for controlling the degree of energization thereof, said means normally reducing said energization below a predetermined amount capable of causing an appreciable torque to be exerted in said element, and an operative connection between the output of said generator and said means effective when the output of said generator is of a predetermined character to condition said means to increase said energization to an amount above said predetermined amount, thus permitting said element to be brought up to a predetermined speed before any appreciable torque is applied thereto.

2. The testing device of claim 1, in which the output of said generator comprises a series of impulses the frequency of which is determined by the speed of rotation thereof, said operative connection including a circuit sensitive to the frequency of said pulses and effective, when said frequency reaches a predetermined magnitude, to condition said means to increase said energization.

3. The testing device of claim 2, in which said frequency sensitive circuit comprises an electron tube having plate, cathode and grid, normally biased to cause said tube to have one mode of operation, the output of said generator being connected to said grid by a circuit including a grid-biasing condenser adapted to be charged by said impulses and a resistor through which said charge can leak off said condenser at a predetermined rate, said condenser, when charged to a predetermined degree, causing said tube to have another mode of operation, the plate of said tube being operatively connected to said energizing circuit so that the energization thereof is below said predetermined amount when said tube has said one mode of operation and is above said predetermined amount when said tube has said other mode of operation.

4. The automatic testing device of claim 1, in which said means in said energizing circuit includes an electron tube comprising a control grid, said operative connection between the output of said generator and said means comprising first biasing means operatively connected to said grid for normally biasing it to cut-off, second biasing means operatively connected to said grid in opposition to said first biasing means and capable of biasing said grid so that said tube will pass current, and control means operatively connected to said second biasing means and to the output of said generator, said control means rendering said second biasing means operatively ineffective until the output of said generator is of said predetermined character.

5. The automatic testing device of claim 4, in which said drag is mounted to have at least a limited degree of movement in opposite directions from a normal position, and auxiliary control means sensitive to the position of said drag and operatively connected to said second biasing means for increasing or decreasing the value thereof, and hence increasing or decreasing the amount of current flowing in said energizing circuit, in accordance with the direction of deviation of the instantaneous position of said drag relative to its normal position.

6. The automatic testing device of claim 4, in which said drag is mounted to have at least a limited degree of freedom of movement away from a normal position, an auxiliary control means sensitive to the position of said drag and operatively connected to said second biasing means for varying the value thereof, and hence varying the amount of current flowing in said energizing circuit, when the instantaneous position of said drag deviates from its normal position.

7. The automatic testing device of claim 4, in which said control means comprises a control circuit including means for varying the current in said control circuit, said second biasing means being connected to said control circuit so that the positive potential applied thereto varies inversely with the current in said control circuit, said control circuit normally passing a current sufficient to retain said second biasing means at a potential insufficient to overcome said first biasing means, said current-varying means being operatively connected to the output of said generator so as to reduce the current passing through said control circuit to a degree sufficient to cause said second biasing means to be at a potential capable of overcoming said first biasing means when the output of said generator is of said predetermined character.

8. The automatic testing device of claim 4, in which said drag is mounted to have at least a limited degree of freedom of movement in opposite directions from a normal position, said second biasing means comprising a condenser, means for charging said condenser to a potential sufficient to overcome said first biasing means, a first switch connecting said condenser and said charging means, and an operative connection between said first switch and said drag, said drag closing said first switch so long as said drag assumes a position lagging behind its normal position relative to the direction of rotation of said element, said control means operatively connected to the output of said generator being connected to said charging means and rendering the latter operatively ineffective until the output of said generator attains said predetermined character, means for discharging said condenser, a second switch connecting said condenser and said discharging means, and an operative connection between said second switch and said drag, said drag closing said second switch whenever said drag assumes a position leading its normal position relative to the direction of rotation of said element.

9. In an automatic testing device for rotating machinery comprising a rotatable element adapted to be connected to and driven by the machine to be tested, an electrically energized drag active on said rotatable element for exerting a torque thereon at least in part dependent on its degree of electrical energization, and an energizing circuit connected to said drag; the improvement which comprises an electrical generator adapted to be operatively connected to and driven by the machine to be tested, the character of the output of said generator being determined by the speed of rotation thereof, normally open-circuit means in said energizing circuit, said means being alterable to closed-circuit condition, and an operative connection between the output of said generator and said normally open-circuit means effective when the output of said generator is of a predetermined character to alter said means to close said circuit and thus energize said drag, thus permitting said element to be brought up to a predetermined speed before any torque is applied thereto.

10. The testing device of claim 9, in which the output of said generator comprises a series of impulses the frequency of which is determined by the speed of rotation thereof, said operative connection including a circuit sensitive to the frequency of said pulses and effective when said frequency reaches a predetermined magnitude, to cause said normally open-circuit means to close said energizing circuit.

11. The testing device of claim 10, in which said frequency sensitive circuit comprises an electron tube having plate, cathode and grid normally biased to cause said tube to have one mode of operation, the output of said generator being connected to said grid by a circuit including a grid-biasing condenser adapted to be charged by said impulses and a resistor through which said charge can leak off said condenser at a predetermined rate, said condenser, when charged to a predetermined degree, causing said tube to have another mode of operation, the plate of said tube being operatively connected to said normally open-circuit means so that said means is in its normally open-circuit condition when said tube has said one mode of operation and so that said means is in closed-circuit condition when said tube has said other mode of operation.

12. The automatic testing device of claim 9, in which said means in said energizing circuit includes an electron tube comprising a control grid, said operative connection between the output of said generator and said means comprising first biasing means operatively connected to said grid for normally biasing it to cut-off, second biasing means operatively connected to said grid in opposition to said first biasing means and capable of biasing said grid so that said tube will pass current, and control means operatively connected to said second biasing means and to the output of said generator, said control means rendering said second biasing means operatively ineffective until the output of said generator is of said predetermined character.

13. The automatic testing device of claim 12, in which said drag is mounted to have at least a limited degree of movement in opposite directions from a normal position, and auxiliary control means sensitive to the position of said drag and operatively connected to said second biasing means for increasing or decreasing the value thereof, and hence increasing or decreasing the amount of current flowing in said energizing circuit, in accordance with the direction of deviation of the instantaneous position of said drag relative to its normal position.

14. The automatic testing device of claim 12, in which said drag is mounted to have at least a limited degree of freedom of movement away from a normal position, an auxiliary control means sensitive to the position of said drag and operatively connected to said second biasing means for varying the value thereof, and hence varying the amount of current flowing in said energizing circuit, whenever the instantaneous position of said drag deviates from its normal position.

15. The automatic testing device of claim 12, in which said control means comprises a control circuit including a source of voltage in series with a resistor and an electron tube comprising plate, grid and cathode, said plate being connected to the positive side of said source via said resistor and said second biasing means being connected between said plate and said resistor, said tube being normally biased to pass a current sufficient to retain said second biasing means at a potential insufficient to overcome said first biasing means, the grid of said tube being operatively connected to the output of said generator so as to be biased to reduce the current flowing through said control circuit tube to a degree sufficient to cause said second biasing means to be at a potential sufficient to overcome said first biasing means when the output of said generator is of said predetermined character.

16. The automatic testing device of claim 12, in which said drag is mounted to have at least a limited degree of freedom of movement away from a normal position, said second biasing means comprising a condenser, means for charging said condenser to a potential sufficient to overcome said first biasing means, a switch connecting said condenser and said charging means, and an operative connection between said switch and said drag, said drag closing said switch so long as said drag assumes a position lagging behind its normal position relative to the direction of rotation of said element, said control means operatively connected to the output of said generator being connected to said charging means and rendering the latter operatively ineffective until the output of said generator attains said predetermined character, means for discharging said condenser, a second switch connecting said condenser and said discharging means, and an operative connection between said second switch and said drag, said drag closing said second switch whenever said drag assumes a position leading its normal position relative to the direction of rotation of said element.

References Cited in the file of this patent

UNITED STATES PATENTS

| Number | Name | Date |
|---|---|---|
| 854,996 | Garland | May 28, 1907 |
| 2,493,758 | Friedrich | Jan. 10, 1950 |

FOREIGN PATENTS

| Number | Country | Date |
|---|---|---|
| 406,836 | Germany | Dec. 3, 1924 |
| 112,203 | Australia | Dec. 19, 1940 |